United States Patent
Lee et al.

(10) Patent No.: US 12,096,037 B2
(45) Date of Patent: Sep. 17, 2024

(54) METHOD AND DEVICE FOR ENCODING OR DECODING VIDEO

(71) Applicant: SK TELECOM CO., LTD., Seoul (KR)

(72) Inventors: Sun Young Lee, Seoul (KR); Jeong-yeon Lim, Seoul (KR); Tae Young Na, Seoul (KR); Gyeong-taek Lee, Seoul (KR); Jae-seob Shin, Seoul (KR); Se Hoon Son, Seoul (KR); Hyo Song Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 17/830,477

(22) Filed: Jun. 2, 2022

(65) Prior Publication Data

US 2022/0295111 A1    Sep. 15, 2022

Related U.S. Application Data

(63) Continuation of application No. 16/960,114, filed as application No. PCT/KR2019/000136 on Jan. 4, 2019, now Pat. No. 11,368,722.

(30) Foreign Application Priority Data

Jan. 5, 2018 (KR) .................. 10-2018-0001728
Jun. 11, 2018 (KR) .................. 10-2018-0066664

(51) Int. Cl.
*H04N 19/70*  (2014.01)
*H04N 19/105* (2014.01)
(Continued)

(52) U.S. Cl.
CPC .......... *H04N 19/70* (2014.11); *H04N 19/105* (2014.11); *H04N 19/119* (2014.11);
(Continued)

(58) Field of Classification Search
CPC .... H04N 19/119; H04N 19/157; H04N 19/42; H04N 19/186; H04N 19/176; H04N 19/105; H04N 19/70
See application file for complete search history.

(56) References Cited

U.S. PATENT DOCUMENTS 9,967,587 B2 *  5/2018  Song ................... H04N 19/52
2012/0163473 A1  6/2012  Laroche et al.
(Continued)

FOREIGN PATENT DOCUMENTS

CN    102986213 A    3/2013
CN    104685876 A    6/2015
(Continued)

OTHER PUBLICATIONS

International Search Report issued on Apr. 9, 2019 for corresponding international application No. PCT/KR2019/000136.
(Continued)

*Primary Examiner* — Neil R Mikeska
(74) *Attorney, Agent, or Firm* — Hauptman Ham, LLP

(57) ABSTRACT

Disclosed herein is a method for decoding a video including determining a coding unit to be decoded by block partitioning, decoding prediction syntaxes for the coding unit, the prediction syntaxes including a skip flag indicating whether the coding unit is encoded in a skip mode, after the decoding of the prediction syntaxes, decoding transform syntaxes including a transformation/quantization skip flag and a coding unit cbf, wherein the transformation/quantization skip flag indicates whether inverse transformation, inverse quantization, and at least part of in-loop filterings are skipped, and the coding unit cbf indicates whether all coefficients in a luma block and two chroma blocks constituting the coding unit are zero, and reconstructing the coding unit based on the prediction syntaxes and the transform syntaxes.

19 Claims, 9 Drawing Sheets

(51) Int. Cl.
*H04N 19/119* (2014.01)
*H04N 19/157* (2014.01)
*H04N 19/176* (2014.01)
*H04N 19/186* (2014.01)

(52) U.S. Cl.
CPC ......... *H04N 19/157* (2014.11); *H04N 19/176* (2014.11); *H04N 19/186* (2014.11)

(56) References Cited

U.S. PATENT DOCUMENTS

| | | |
|---|---|---|
| 2013/0034152 A1 | 2/2013 | Song et al. |
| 2013/0343455 A1 | 12/2013 | Yamamoto |
| 2014/0092983 A1 | 4/2014 | Joshi et al. |
| 2014/0146894 A1 | 5/2014 | Yu et al. |
| 2015/0016515 A1 | 1/2015 | Naccari et al. |
| 2015/0249828 A1 | 9/2015 | Rosewarne et al. |
| 2015/0264348 A1* | 9/2015 | Zou ................ H04N 19/593 375/240.02 |
| 2016/0100175 A1* | 4/2016 | Laroche ............ H04N 19/186 375/240.18 |
| 2017/0180737 A1* | 6/2017 | Ye .................... H04N 19/119 |
| 2018/0176601 A1* | 6/2018 | Jeong ............... H04N 19/593 |
| 2020/0145649 A1* | 5/2020 | Kim .................. H04N 19/159 |

FOREIGN PATENT DOCUMENTS

| | | |
|---|---|---|
| CN | 104782125 A | 7/2015 |
| CN | 107087178 A | 8/2017 |
| KR | 10-2015-0048804 A | 5/2015 |
| KR | 10-1540529 B1 | 7/2015 |
| KR | 10-2016-0037246 A | 4/2016 |
| KR | 10-1621330 B1 | 5/2016 |
| KR | 10-2017-0069912 A | 6/2017 |
| WO | 2012/102867 A1 | 8/2012 |
| WO | 2012/119376 A1 | 9/2012 |
| WO | 2014/071439 A1 | 5/2014 |
| WO | 2012/059577 A1 | 5/2015 |
| WO | 2017/099371 A1 | 6/2017 |

OTHER PUBLICATIONS

Jianle Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, 7th Meeting: Torino, IT, Jul. 13-21, 2017, 14 pages, cited in NPL 3.
Chinese Office Action issued on Nov. 24, 2021, in connection with the Chinese Patent Application No. 201980017079.X.

\* cited by examiner (a)

(b)

METHOD AND DEVICE FOR ENCODING OR DECODING VIDEO

CROSS-REFERENCE TO RELATED APPLICATION

The present application is a continuation of U.S. patent application Ser. No. 16/960,114, filed on Jan. 25, 2021, which a national stage filing under 35 U.S.C § 371 of PCT application number PCT/KR2019/000136 filed on Jan. 4, 2019 which is based upon and claims the benefit of priorities to Korean Patent Application No. 10-2018-0001728, filed on Jan. 5, 2018 and Korean Patent Application No. 10-2018-0066664, filed on Jun. 11, 2018, in the Korean Intellectual Property Office, which are incorporated herein in their entireties by reference.

TECHNICAL FIELD

The present disclosure relates to encoding and decoding of a video. In one aspect, the present disclosure relates to encoding or decoding syntaxes for a coding unit that is a basic unit of encoding.

BACKGROUND ART

Since the volume of video data is larger than that of voice data or still image data, storing or transmitting video data without compression requires a lot of hardware resources including memory. Accordingly, in storing or transmitting video data, the video data is compressed using an encoder so as to be stored or transmitted. Then, a decoder receives the compressed video data, and decompresses and reproduces the video data. Compression techniques for such video include H.264/AVC and High Efficiency Video Coding (HEVC), which was established in early 2013 and improved coding efficiency over H.264/AVC by about 40%.

FIG. 1 is a diagram illustrating block partitioning in HEVC.

In HEVC, one picture is split into a plurality of coding tree units (CTUs) of a square shape, and each CTU is recursively split into a plurality of coding units (CUs) of a square shape by a quadtree structure. When a CU, which is a basic unit of encoding, is determined, the CU is split into one or more prediction units (PUs) and predicted on a PU-by-PU basis. Splitting the CU into PUs is performed by selecting one splitting type having good coding efficiency from among multiple splitting types. An encoding apparatus encodes prediction syntaxes for each PU such that a decoding apparatus may predict each PU in the same manner as the encoding apparatus.

In addition, the CU is split into one or more transform units (TUs) by a quadtree structure, and residual signals, which are differences between actual pixels and predicted pixels, are transformed using the size of the TU. Syntaxes for transformation are encoded on a TU-by-TU basis and transmitted to the decoding apparatus.

As described above, HEVC has a complex block partitioning structure, such as partitioning of a CTU into CUs, partitioning of a CU into PUs, and partitioning of a CU into TUs. Accordingly, the CU, the PU, and the TU may be blocks having different sizes. In this block partitioning structure of HEVC, it is necessary to separately encode related syntaxes for a CU, and PUs and TUs in the CU. In HEVC, syntaxes for a CU are initially encoded. Then, the CU invokes each PU to encode syntaxes for each PU, and also invokes each TU to encode syntaxes for each TU.

In order to address the complexity of the block partitioning structure and syntax structure, a block partitioning technique of splitting a CTU into CUs and then using each CU as a PU and a TU is newly discussed. In this new partitioning structure, when a CU is determined, prediction and transformation are performed in the size of the CU without additional partitioning. That is, the CU, the PU and the TU are the same block. The introduction of the new partitioning structure requires a new structure for encoding syntaxes for the CU.

DISCLOSURE

Technical Problem

In order to meet the requirement, one aspect of the present invention proposes a new structure for encoding or decoding syntaxes for a coding unit.

SUMMARY

In accordance with one aspect of the present disclosure, provided is a method for decoding a video including determining a coding unit to be decoded by block partitioning, decoding prediction syntaxes for the coding unit, the prediction syntaxes including a skip flag indicating whether the coding unit is encoded in a skip mode, after the decoding of the prediction syntaxes, decoding transform syntaxes including a transformation/quantization skip flag and a coding unit cbf, wherein the transformation/quantization skip flag indicates whether inverse transformation, inverse quantization, and at least part of in-loop filterings are skipped, and the coding unit cbf indicates whether all coefficients in a luma block and two chroma blocks constituting the coding unit are zero, and reconstructing the coding unit based on the prediction syntaxes and the transform syntaxes.

In accordance with another aspect of the present disclosure, provided is a video decoding apparatus including a decoder configured to determine a coding unit to be decoded by block partitioning, decode prediction syntaxes for the coding unit, the prediction syntaxes including a skip flag indicating whether the coding unit is encoded in a skip mode, and decode, after the decoding of the prediction syntaxes, transform syntaxes for the coding unit including a transformation/quantization skip flag and a coding unit cbf, wherein the transformation/quantization skip flag indicates whether inverse transformation, inverse quantization, and at least part of in-loop filterings are skipped, and the coding unit cbf indicates whether all coefficients in a luma block and two chroma blocks constituting the coding unit are zero, and a reconstructor configured to reconstruct the coding unit based on the prediction syntaxes and the transform syntaxes.

DETAILED DESCRIPTION

Figure 1:
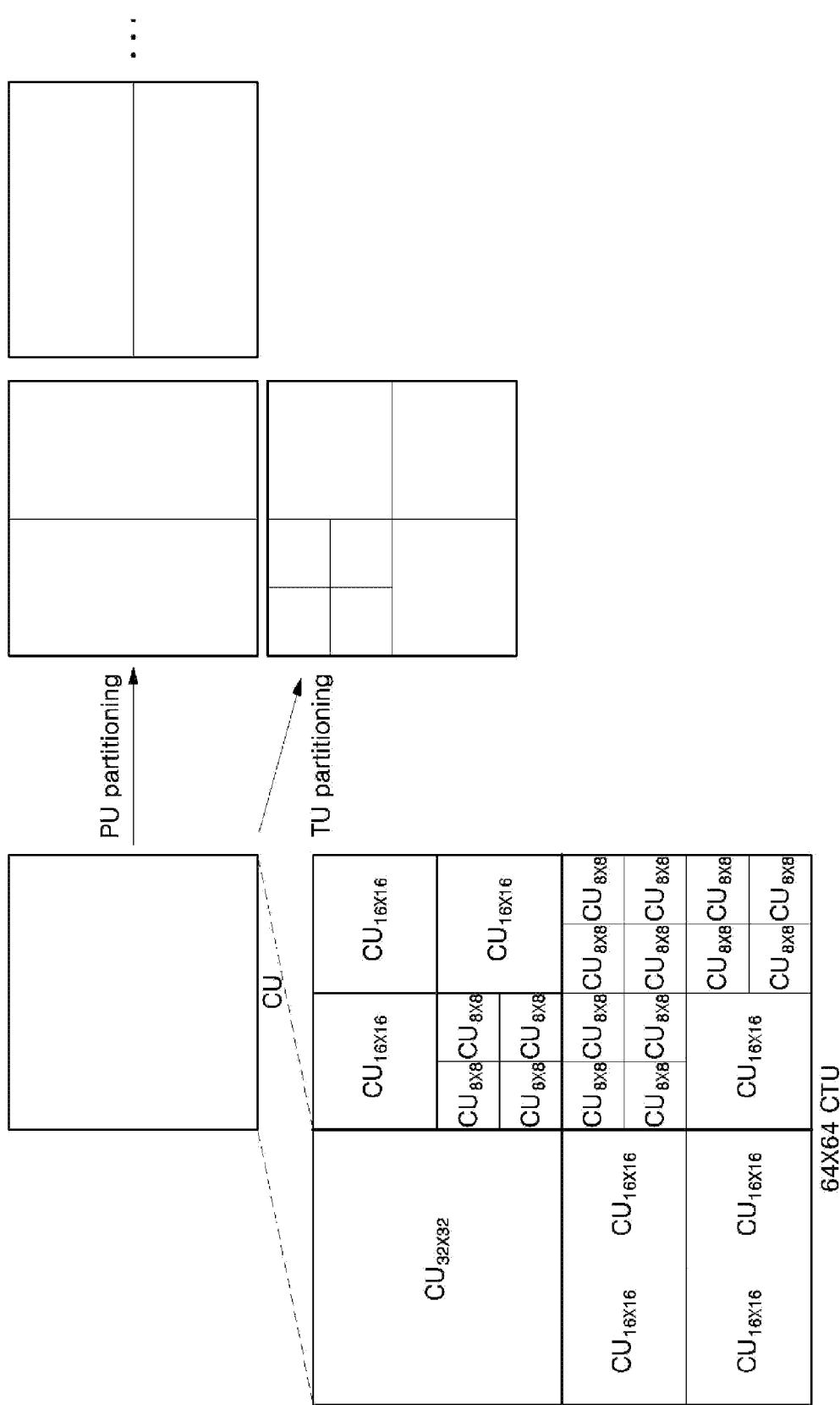
FIG. 1 is a diagram illustrating block partitioning in HEVC.

Hereinafter, some embodiments of the present invention will be described in detail with reference to the accompanying drawings. It should be noted that, in adding reference numerals to the constituent elements in the respective drawings, like reference numerals designate like elements, although the elements are shown in different drawings. Further, in the following description of the present invention, a detailed description of known functions and configurations incorporated herein will be omitted when it may make the subject matter of the present invention rather unclear.

Figure 2:
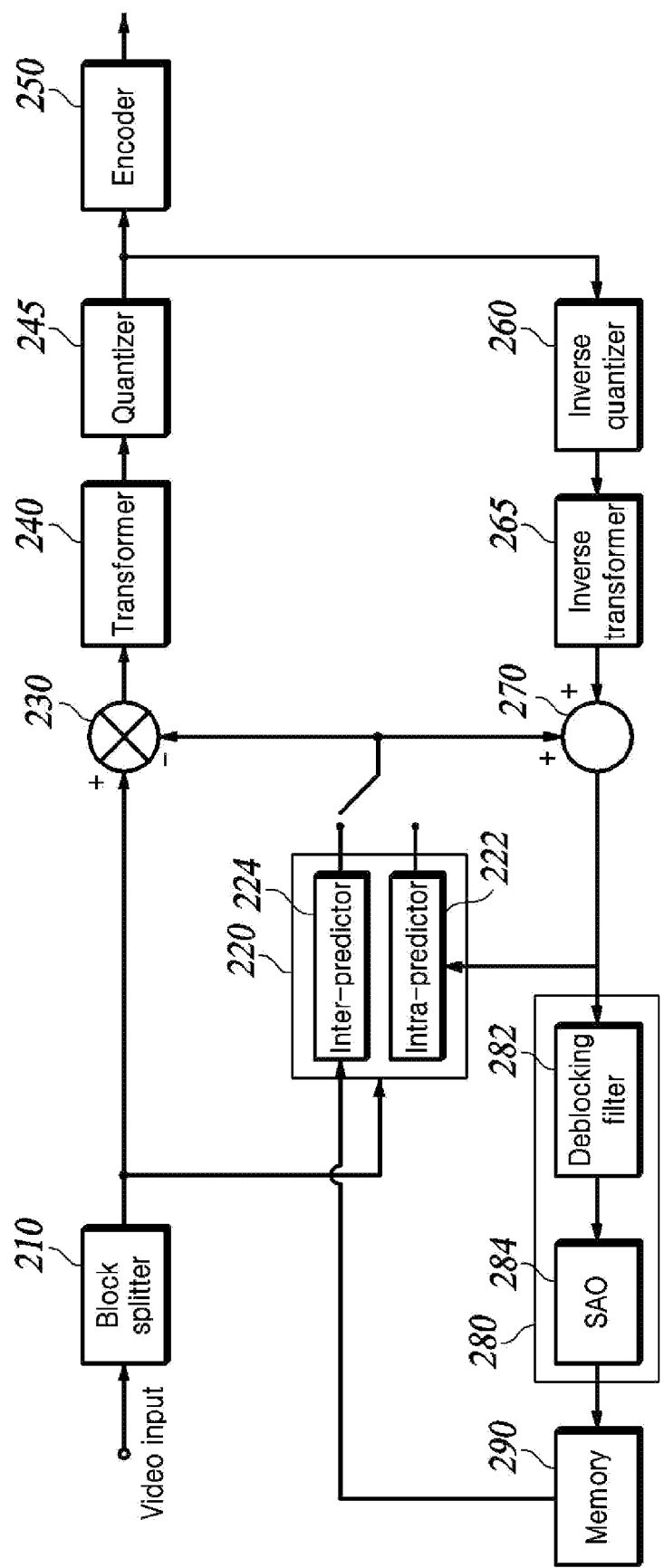
FIG. 2 is an exemplary block diagram of a video encoding apparatus capable of implementing the techniques of the present disclosure.

FIG. 2 is an exemplary block diagram of a video encoding apparatus capable of implementing techniques of the present disclosure.

The video encoding apparatus includes a block splitter 210, a predictor 220, a subtractor 230, a transformer 240, a quantizer 245, an encoder 250, an inverse quantizer 260, an inverse transformer 265, an adder 270, an in-loop filter 280, and a memory 290. Each element of the video encoding apparatus may be implemented as a hardware chip, or may be implemented as software, and one or more microprocessors may be implemented to execute the functions of the software corresponding to the respective elements.

One video is composed of a plurality of pictures. Each picture is split into a plurality of regions, and encoding is performed for each region. For example, one picture is split into one or more slices and/or tiles, and each slice or tile is split into one or more coding tree units (CTUs). In addition, each CTU is split into one or more coding units (CUs) by a tree structure. Information applied to each CU is coded as the syntax of the CU, and information applied to CUs included in one CTU in common is coded as the syntax of the CTU. Information applied to all blocks in one slice in common is coded as the syntax of the slice, and information applied to all blocks constituting one picture is coded in a picture parameter set (PPS). Further, information referred to by a plurality of pictures in common is coded in a sequence parameter set (SPS). In addition, information referred to by one or more SPSs in common is coded in a video parameter set (VPS).

The block splitter 210 determines the size of a coding tree unit (CTU). Information about the size of the CTU (CTU size) is encoded as syntax of the SPS or PPS and is transmitted to the video decoding apparatus. The block splitter 210 splits each picture constituting the video into a plurality of CTUs of a determined size, and then recursively splits the CTUs using a tree structure. A leaf node in the tree structure serves as a coding unit (CU), which is a basic unit of coding. The tree structure may a QuadTree (QT) structure, in which a node (or parent node) is split into four sub-nodes (or child nodes) of the same size, a BinaryTree (BT) structure, in which a node is split into two sub-nodes, a TernaryTree (TT) structure, in which a node is split into three sub-nodes at a ratio of 1:2:1, or a structure employing one or more of the QT structure, the BT structure, and the TT structure. For example, a QuadTree plus BinaryTree (QTBT) structure may be used, or a QuadTree plus BinaryTree TernaryTree (QTBTTT) structure may be used.

Figure 3:
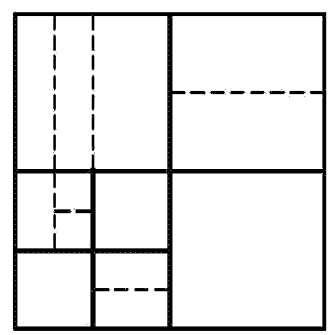
FIG. 3 is an exemplary diagram of block partitioning using a QTBT structure.
Figure 3:
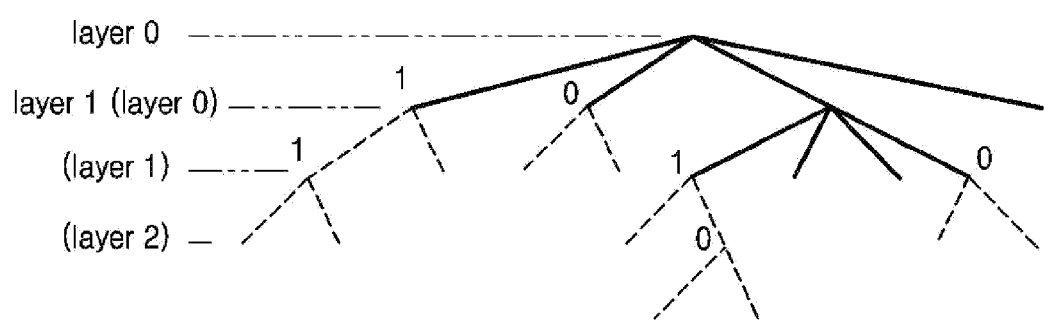

FIG. 3 is an exemplary diagram of block partitioning using a QTBT structure. In FIG. 3, (a) illustrates partitioning a block by a QTBT structure, and (b) represents the partitioning in a tree structure. In FIG. 3, the solid lines represent partitioning by the QT structure, and the dotted lines represent partitioning by the BT structure. In FIG. 3(*b*), regarding notation of layers, a layer expression without parentheses denotes a layer of QT, and a layer expression in parentheses denotes a layer of BT. In the BT structure represented by dotted lines, the numbers are the partitioning type information.

As shown in FIG. 3, a CTU may be initially split according to the QT structure. The QT splitting may be repeated until the size of the splitting block reaches the minimum block size MinQTSize of the leaf node allowed in QT. A first flag (QT_split_flag) indicating whether each node of the QT structure is split into four nodes of a lower layer is encoded by the encoder 250 and signaled to the video decoding apparatus.

When the leaf node of the QT is not greater than the maximum block size (MaxBTSize) of the root node allowed in the BT, it may be further partitioned into the BT structure. The BT may have a plurality of splitting types. For example, in some examples, there may be two splitting types, which are a type of horizontally splitting a block into two blocks of the same size (i.e., symmetric horizontal splitting) and a type of vertically splitting a block into two blocks of the same size (i.e., symmetric vertical splitting). A second flag (BT_split_flag) indicating whether each node of the BT structure is split into block of a lower layer and splitting type information indicating the splitting type are encoded by the encoder 250 and transmitted to the video decoding apparatus. There may be an additional type of splitting a block of a node into two asymmetric blocks. The asymmetric splitting type may include a type of splitting a block into two rectangular blocks at a size ratio of 1:3, or a type of splitting a block of a node in a diagonal direction.

Alternatively, the QTBTTT structure may be used. In the QTBTTT structure, a CTU may be initially split into a QT structure, and then leaf nodes of the QT may be split into one or more of a BT structure or a TT structure. The TT structure may also have a plurality of splitting types. For example, regarding splitting, there may be two splitting types: one type is horizontally splitting a block of a corresponding node into three blocks at 1:2:1 ratio (i.e., symmetric horizontal splitting) and the other type is vertical splitting at 1:2:1 ratio (i.e., symmetric vertical splitting). In the case of QTBTTT, not only a flag indicating whether each node is split into blocks of a lower layer and splitting type information (or splitting direction information) indicating a splitting type (or a splitting direction), but also supplemental information for distinguishing whether the splitting structure is a BT structure or a TT structure may be signaled to the video decoding apparatus.

CUs may have various sizes according to QTBT or QTBTTT splitting of a CTU. In the present disclosure, a CU is not further split for prediction or transformation. That is, the CU, PU, and TU are blocks that have the same size and are present at the same position.

The predictor 220 predicts a CU to generate a prediction block. The predictor 220 predicts a luma component and a chroma component constituting the CU, respectively.

In general, CUs within a picture may each be predictively coded. In general, prediction of the CUs may be accomplished using an intra-prediction technique, which uses data from a picture containing the CUs, or an inter-prediction technique, which uses data from a picture encoded before the picture containing the CUs. Inter-prediction includes both unidirectional prediction and bidirectional prediction. To this end, the predictor 220 includes an intra-predictor 222 and an inter-predictor 224.

Figure 4:
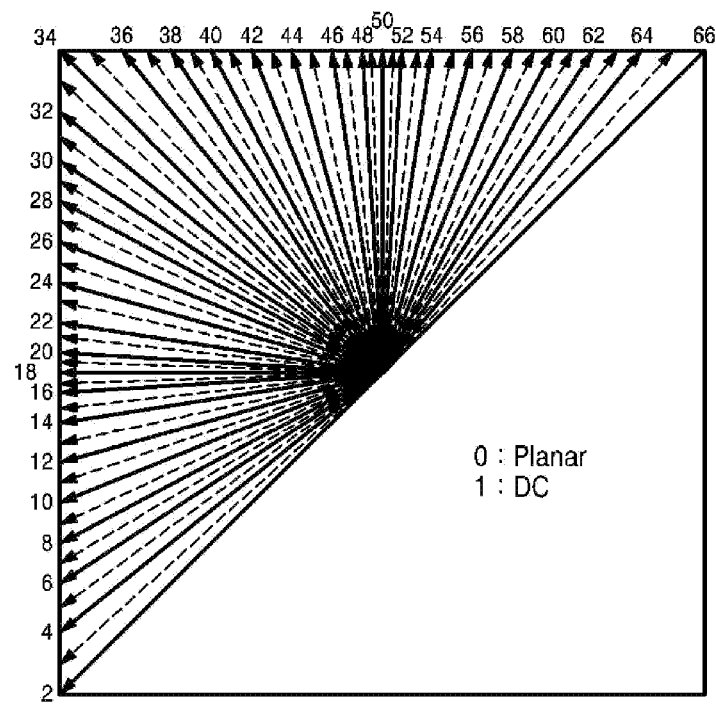
FIG. 4 is an exemplary diagram for a plurality of intra-prediction modes.

The intra-predictor 222 predicts pixels in the CU using pixels (reference samples) located around the CU in the current picture in which the CU is included. There is a plurality of intra-prediction modes according to the prediction directions. For example, as shown in FIG. 4, the plurality of intra-prediction modes may include non-directional modes, which may include a planar mode and a DC mode, and 65 directional modes. Peripheral pixels and an equation to be used are defined differently according to each prediction mode.

The intra-predictor 222 may determine an intra-prediction mode to be used in encoding the CU. In some examples, the intra-predictor 222 may encode the CU using several intra-prediction modes and select an appropriate intra-prediction mode to use from the tested modes. For example, the intra-predictor 222 may calculate rate distortion values using rate-distortion analysis of several tested intra-prediction modes, and may select an intra-prediction mode that has the best rate distortion characteristics among the tested modes.

The intra-predictor 222 selects one intra-prediction mode from among the plurality of intra-prediction modes, and predicts the CU using neighboring pixels (reference samples) and an equation which are determined according to the selected intra-prediction mode. The syntaxes for indicating the selected intra-prediction mode are encoded by the encoder 250 and transmitted to the video decoding apparatus. The intra-prediction mode selected to predict the luma component in the CU may be used to predict the chroma component. However, the present disclosure is not limited thereto. For example, the intra-prediction mode selected for the luma component and a plurality of intra-prediction modes for the chroma component may be configured as candidates, and one of the candidates may be used as an intra-prediction mode for the chroma component. In this case, the syntax for the intra-prediction mode corresponding to the chroma component is separately signaled.

The inter-predictor 224 generates a prediction block for the CU through motion compensation. The inter-predictor searches for a block most similar to the CU in a reference picture encoded and decoded earlier than the current picture, and generates a prediction block for the CU using the searched block. Then, the inter-predictor generates a motion vector corresponding to a displacement between the CU in the current picture and the prediction block in the reference picture. In general, motion estimation is performed on a luma component, and a motion vector calculated based on the luma component is used for both the luma component and the chroma component. The motion information including information about the reference picture and information about a motion vector used to predict the CU is encoded by the encoder 250 and transmitted to the video decoding apparatus. In general, the information about the reference picture means a reference picture index for identifying the reference picture used for inter-prediction of a CU among a plurality of reference pictures, and the information about a motion vector means a motion vector difference between an actual motion vector and a predicted motion vector of the CU.

Other methods may be used to minimize the number of bits required to encode motion information. For example, when the reference picture and the motion vector of the current block are the same as the reference picture and the motion vector of a neighboring block, the motion information about the current block may be transmitted to the decoding apparatus by encoding information for identifying the neighboring block. This method is called a "merge mode."

Figure 5:
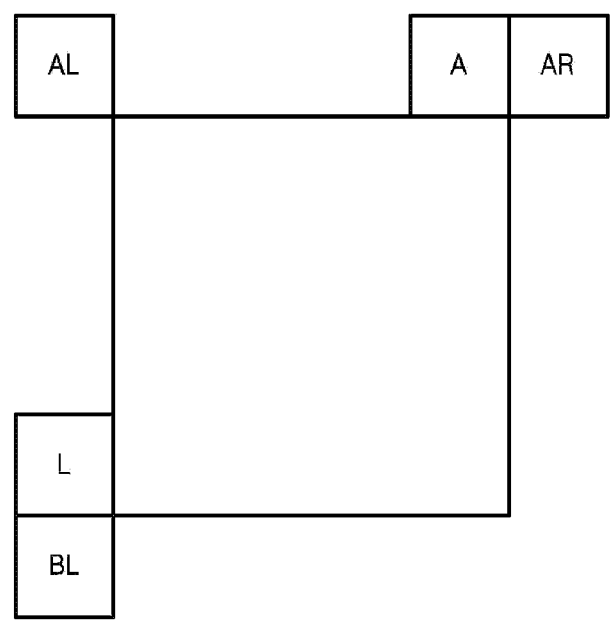
FIG. 5 is an exemplary diagram of peripheral blocks of a current CU.

In the merge mode, the inter-predictor 224 selects a predetermined number of merge candidate blocks (hereinafter referred to as "merge candidates") from among the neighboring blocks of the current block. As illustrated in FIG. 5, as neighboring blocks for deriving merge candidates, all or part of a left block L, an above block A, an above right block AR, a bottom left block BL, and an above left block AL which are adjacent to the current block in the current picture may be used. In addition, a block located within a reference picture (which may be the same as or different from the reference picture used to predict the current block) other than the current picture in which the current block is located may be used as a merge candidate. For example, a co-located block which is at the same position as the current block or blocks adjacent to the co-located block in the reference picture may also be used as merge candidates. The inter-predictor 224 configures a merge list including a predetermined number of merge candidates using such neighboring blocks. Merge candidates to be used as the motion information about the current block are selected from among the merge candidates included in the merge list, and a merge index for identifying the selected candidates is generated. The generated merge index is encoded by the encoder 250 and transmitted to the decoding apparatus.

The subtractor 230 subtracts the prediction pixels in the prediction block generated by the intra-predictor 222 or the inter-predictor 224 from the actual pixels in the CU to generate a residual block.

The transformer 240 transforms residual signals in the residual block having pixel values in the spatial domain into transform coefficients in the frequency domain. The transformer 240 transforms the residual signals in the residual block using a transform unit of the CU size. The quantizer 245 quantizes the transform coefficients output from the transformer 240 and outputs the quantized transform coefficients to the encoder 250. While it has been described that transformation and quantization of the residual signals are always performed, the present disclosure is not limited thereto. Any one or more of transformation and quantization may be selectively skipped. For example, only one of transformation and quantization may be skipped, or both transformation and quantization may be skipped.

The encoder 250 encodes information such as a CTU size, a QT split flag, a BT split flag, and a splitting type, which are associated with block splitting, such that the video decoding apparatus may split the block in the same manner as in the video encoding apparatus.

In addition, the encoder 250 encodes information that is needed for the video decoding apparatus to reconstruct the CU and transmits the information to the video decoding apparatus. In the present disclosure, the encoder 250 initially encodes prediction syntaxes required to predict the CU. The prediction syntaxes encoded by the encoder 250 include a skip flag (skip_flag) indicating whether the CU is encoded in a skip mode. Here, the skip mode is a special case of the merge mode, and is different from the merge mode in that no information about the CU is encoded after the merge index (merge_idx) is encoded. Therefore, in the skip mode, no transform syntax is coded and all coefficients in the CU are set to 0. When the CU is encoded in the skip mode, the video decoding apparatus generates a prediction block using the motion vector and reference picture of the merge candidate indicated by the merge index as the motion vector and reference picture of the current CU. Since the residual signals are all set to 0, the prediction block is reconstructed as the CU. In addition, whether to apply deblocking filtering or SAO filtering on the CU that is encoded in the skip mode may be applied by syntaxes signaled at a higher level (e.g., CTU, slice, PPS, etc.) than the CU. For example, when the syntax (slice_sao_flag) indicating whether to apply the SAO is signaled on a slice-by-slice, whether to apply the SAO to the CUs which are encoded in the skip mode in the corresponding slice is determined according to the syntax (slice_sao_flag). Alternatively, at least some in-loop filtering may be skipped when the CU is encoded in the skip mode. For example, transquant_skip_flag, which will be described later, may be automatically set to 1, and transformation, quantization, and at least some in-loop filtering for the CU may be skipped.

When the CU is not encoded in the skip mode, the prediction syntaxes include prediction type information (pred_mode_flag) indicating whether the CU is encoded by intra-prediction or inter-prediction, and intra-prediction information (that is, information about the intra-prediction mode) or inter-prediction information (information about the reference picture and motion vector) according to the prediction type. The inter-prediction information includes a merge flag (merge_flag) indicating whether the reference picture and motion vector of the CU are encoded in the merge mode, and includes a merge index (merge_idx) when merge_flag is 1, or the picture information and motion vector difference information when merge_flag is 0. In addition, the predictive motion vector information may be additionally included.

After encoding the prediction syntaxes, the encoder 250 encodes transform syntaxes required to transform the CU. The transform syntaxes include information related to selective skipping of transformation and quantization and information about the coefficients in the CU. Here, when there are two or more transform methods, the transform syntaxes include information indicating a type of transformation used for the CU. Here, the types of transformation applied to the horizontal axis direction and the vertical axis direction may be included, respectively.

The information related to selective skipping of transformation and quantization may include a transformation/quantization skip flag (transquant_skip_flag) indicating whether to skip transformation, quantization, and at least some in-loop filtering for a CU, and a transform skip flag (transform_skip_flag) indicating whether to skip the transformation for each of the luma component and chroma components constituting the CU, respectively. The transform skip flag (transform_skip_flag) is individually coded for each of components constituting the CU. However, the present disclosure is not limited thereto, and the transform skip flag may be encoded only once for one CU. In this case, when the transform_skip_flag is 1, transformation on the CU, that is, transformation on both the luminance and chroma components constituting the CU is skipped.

The information related to the selective skipping of transformation and quantization may be represented by one syntax (transquant_idx). In this case, the syntax may have four values. For example, transquant_idx=0 means that both transformation and quantization are skipped, transquant_idx=1 means that only quantization is performed, transquant_idx=2 means that only transformation is performed, and transquant_idx=3 means that both transformation and quantization are performed. This syntax may be binarized using a fixed length (FL) binarization method so that the four values are the same bit. For example, it may be binarized as shown in Table 1.

TABLE 1

| transquant_idx | Transform | Quantization | Binarization (FL) |
|---|---|---|---|
| 0 | off | off | 00 |
| 1 | off | on | 01 |
| 2 | on | off | 10 |
| 3 | on | on | 11 |

Alternatively, this syntax may be binarized using a truncated unary (TU) binarization method such that fewer bits are allocated to a value having a higher probability of occurrence. For example, the probability that both transformation and quantization are performed is typically the largest, followed by the probability that only the quantization is performed with the transformation skipped. Therefore, the syntax may be binarized as shown in Table 2.

TABLE 2

| transquant_idx | Transform | Quantization | Binarization (TU) |
|---|---|---|---|
| 0 | Off | off | 111 |
| 1 | off | on | 10 |
| 2 | on | off | 110 |
| 3 | on | on | 0 |

Information about the coefficients in the CU includes coded block flags (cbf) indicating whether non-zero coefficients are present in the luma component and the two chroma components of the CU, and syntaxes for indicating the values of the coefficients. Here, the "coefficients" may be quantized transform coefficients (when both transformation and quantization are performed), or may be quantized residual signals obtained by skipping transformation (when the transformation is skipped), or residual signals (when both the transformation and the quantization are skipped).

In the present disclosure, the structure or order in which the encoder 250 encodes the prediction syntaxes and transform syntaxes for the CU is the same as the structure or order in which the decoder 610 of the video decoding apparatus, which will be described later, decodes the encoded prediction and transform syntaxes. Since the structure or order in which the encoder 250 encodes the syntaxes will be clearly understood from the structure or order in which the decoder 610 decodes the syntaxes, details of the syntax encoding structure or order by the encoder 250 is omitted to avoid redundant description.

The inverse quantizer 260 inversely quantizes the quantized transform coefficients output from the quantizer 245 to generate transform coefficients. The inverse transformer 265 transforms the transform coefficients output from the inverse quantizer 260 from the frequency domain to the spatial domain and reconstructs the residual block.

The adder 270 adds the reconstructed residual block to the prediction block generated by the predictor 220 to reconstruct the CU. The pixels in the reconstructed CU are used as reference samples in performing intra-prediction of the next block in order.

The in-loop filter 280 filters the reconstructed pixels to reduce blocking artifacts, ringing artifacts, and blurring artifacts generated due to block-based prediction and transformation/quantization. The in-loop filter 280 may include a deblocking filter 282 and an SAO filter 284. The deblocking filter 180 filters the boundary between the reconstructed blocks to remove blocking artifacts generated due to block-by-block coding/decoding, and the SAO filter 284 performs additional filtering on the deblocking-filtered picture. The SAO filter 284 is used to compensate for a difference between a reconstructed pixel and an original pixel caused by lossy coding. Since the deblocking filter and SAO are filtering techniques defined in the HEVC standard technology, further detailed description thereof is omitted.

The reconstructed blocks filtered through the deblocking filter 282 and the SAO filter 284 are stored in the memory 290. Once all blocks in one picture are reconstructed, the reconstructed picture is used as a reference picture for inter-prediction of a block in a picture to be encoded.

Figure 6:
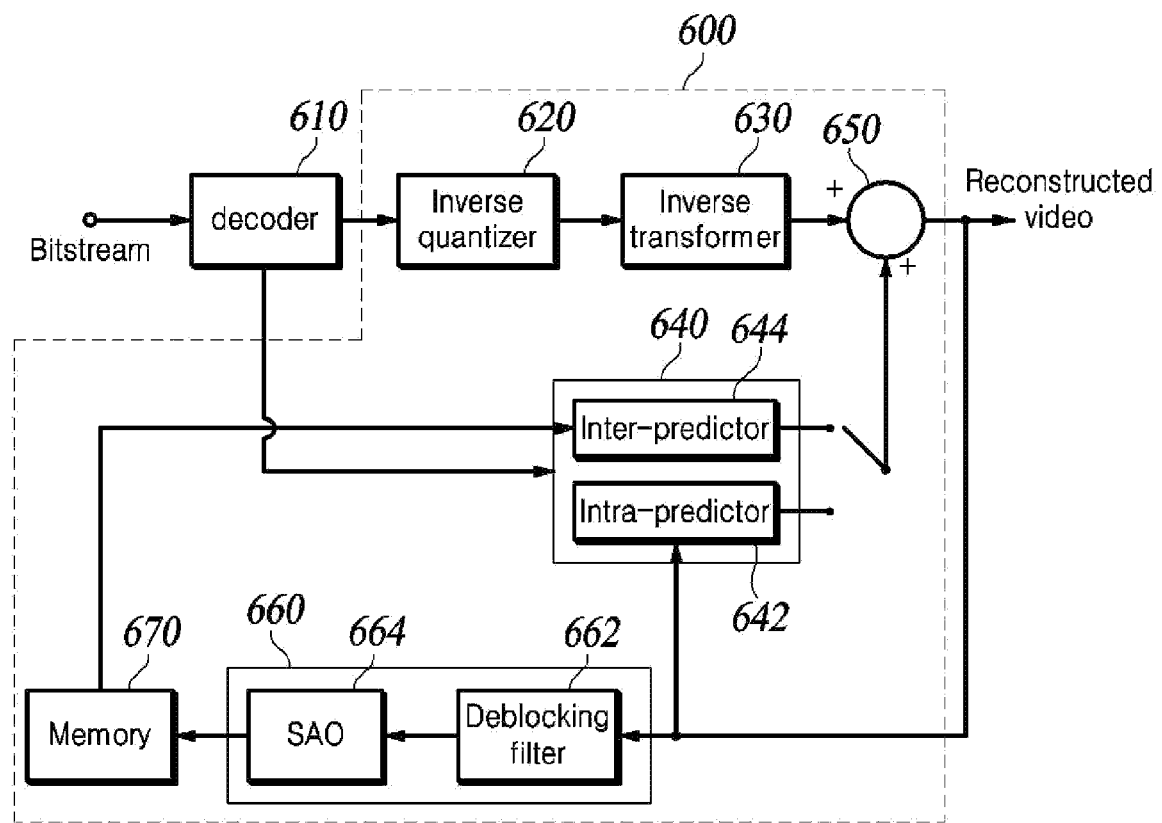
FIG. 6 is an exemplary block diagram of a video decoding apparatus capable of implementing the techniques of the present disclosure.

FIG. 6 is an exemplary block diagram of an video decoding apparatus capable of implementing the techniques of the present disclosure.

The video decoding apparatus includes a decoder 610 and a reconstructor 600. The reconstructor 600 includes an inverse quantizer 620, an inverse transformer 630, a predictor 640, and an adder 650, and an in-loop filter 660, and a memory 670. Similar to the video encoding apparatus of FIG. 2, each element of the video decoding apparatus may be implemented as a hardware chip, or may be implemented as software, and one or more microprocessors may be implemented to execute the functions of the software corresponding to each element.

The decoder 610 decodes a bitstream received from the video encoding apparatus. The decoder 610 determines a to-be-decoded CU by decoding information related to block splitting. The decoder 610 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node, of a tree structure, and extracts split information of the CTU to thereby split the CTU using the tree structure. For example, when the CTU is split using a QTBT structure, a first flag (QT_split_flag) related to the QT split is extracted to split each node into four nodes of a lower layer. For a node corresponding to the leaf node of the QT, the second flag (BT_split_flag) and split type (split direction) information related to the BT split are extracted and the corresponding leaf node is split in the BT structure. As another example, when a CTU is split using the QTBTTT structure, the first flag (QT_split_flag) related to the QT split is extracted, and each node is split into four sub-nodes of a lower layer. In addition, for a node corresponding to a leaf node of QT, split_flag indicating whether the node is further split into BT or TT, split type (or split direction) information and additional information for distinguishing the BT structure or the TT structure are extracted. Thereby, each node under the leaf node of QT is recursively split into a BT or TT structure.

The decoder 610 also decodes, from the bitstream, the prediction syntaxes and transform syntaxes necessary for reconstructing the CU. In this operation, the decoder decodes the prediction syntaxes, and then decodes the transform syntaxes. The structure in which the decoder 610 decodes the prediction syntaxes and transform syntaxes will be described later with reference to FIG. 7 and subsequent figures.

The inverse quantizer 620 inversely quantizes the coefficients derived from the transform syntaxes. The inverse transformer 630 inversely transforms the inversely quantized coefficients from the frequency domain to the spatial domain to reconstruct the residual signals, and thereby generates a residual block for the CU. One or more of the inverse quantization or inverse transformation may be skipped according to information related to selective skipping of transformation and quantization included in the transform syntaxes decoded by the decoder.

The predictor 640 generates prediction blocks for the CU using the prediction syntaxes. The predictor 640 includes an intra-predictor 642 and an inter-predictor 644. The intra-predictor 642 is activated when the prediction type of the CU is the intra-prediction, and the inter-predictor 644 is activated when the prediction type of the CU is the inter-prediction.

The intra-predictor 642 determines an intra-prediction mode of the CU among the plurality of intra-prediction modes from the intra-prediction information extracted from the decoder 610, and predicts the CU using reference samples around the CU according to the intra-prediction mode.

The inter predictor 644 determines a motion vector of the CU and a reference picture referenced by the motion vector using the inter-prediction information extracted from the decoder 610, and predicts the CU using the motion vector and the reference picture. For example, when merge_flag is 1, after merge_idx is extracted and a merge list is configured in the same manner as in the image encoding apparatus, the inter predictor 644 sets the motion vector and reference picture of the current CU into a motion vector and reference picture of a block indicated by merge_idx among the merge candidates included in the merge list. On the other hand, when merge_flag is 0, the reference picture information and the motion vector difference information are extracted from the bitstream to determine the motion vector and reference picture of the current CU. In this case, predictive motion vector information may be additionally extracted.

The adder 650 adds the residual block output from the inverse transformer and the prediction block output from the inter-predictor or intra-predictor to reconstruct the CU. The pixels in the reconstructed CU are utilized as reference samples for intra-prediction of a block to be decoded later.

By sequentially reconstructing the CUs, a CTU composed of the CUs and a picture composed of CTUs are reconstructed.

The in-loop filter 660 includes a deblocking filter 662 and an SAO filter 664. The deblocking filter 662 deblock-filters the boundary between the reconstructed blocks to remove blocking artifacts generated due to block-by-block decoding. The SAO filter 664 performs additional filtering on the reconstructed blocks after the deblock-filtering to compensate for the difference between the reconstructed pixels and the original pixels, which results from lossy coding. The reconstructed blocks filtered through the deblocking filter 662 and the SAO filter 664 are stored in the memory 670. When all the blocks in one picture are reconstructed, the reconstructed picture is used as a reference picture for inter-prediction of blocks in a subsequent picture to be decoded.

Hereinafter, a structure or procedure in which the decoder 610 of the video decoding apparatus decodes CU syntaxes is described in detail.

As described above, the video decoding apparatus initially decodes prediction syntaxes of the coding unit including a skip_flag (skip_flag). After decoding all the prediction syntaxes, the video decoding apparatus decodes transform syntaxes including a transquant_skip_flag and coding unit cbf (cbf_cu). Here, cbf_cu is a syntax indicating whether all coefficients in one luma block and two chroma blocks constituting the coding unit are 0. The transform syntaxes are decoded when skip_flag is 0, that is, when the prediction type of the current CU is not in the skip mode.

Figure 7:
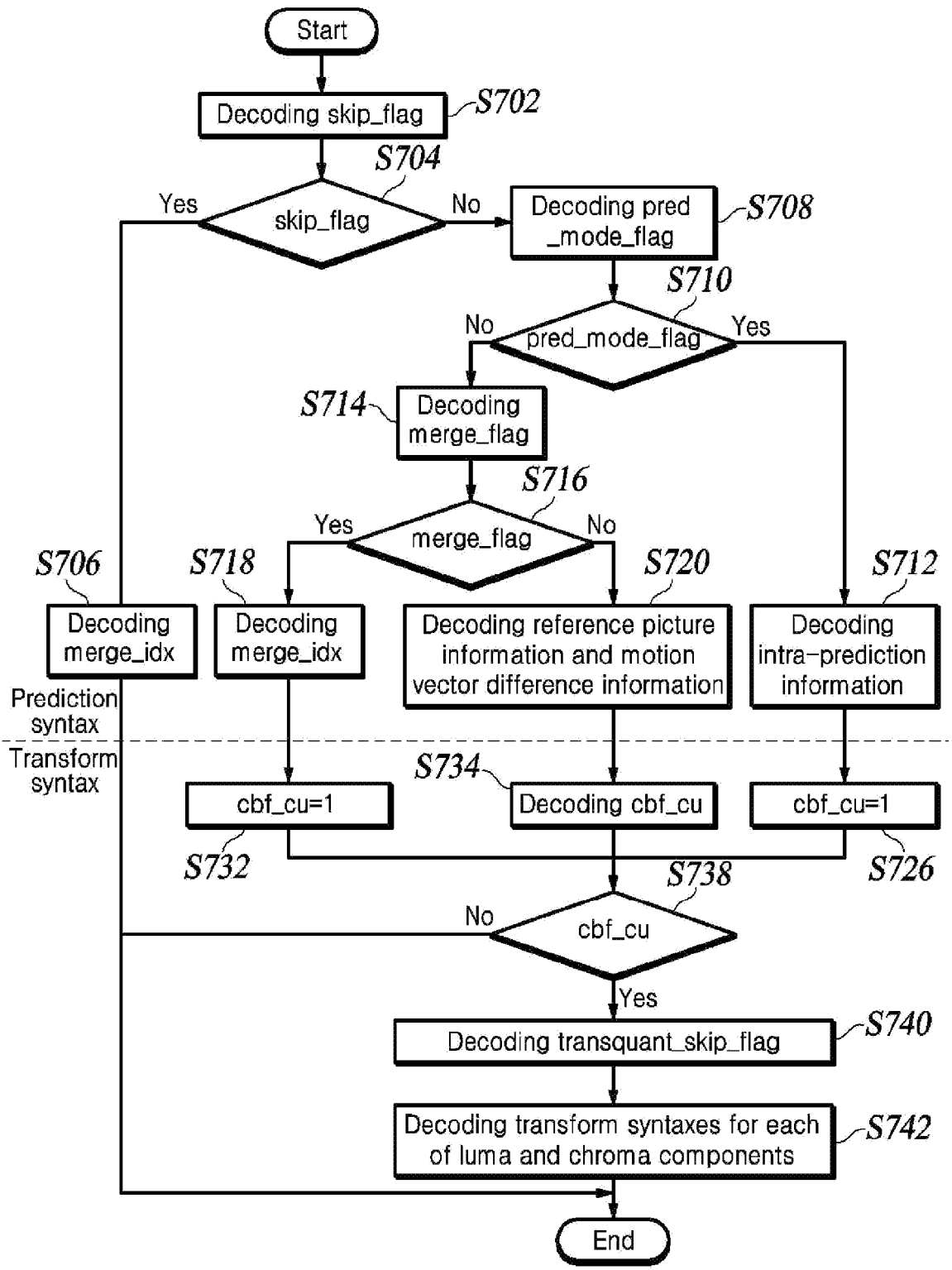
FIG. 7 is an exemplary flowchart for decoding CU syntaxes according to the present disclosure.

FIG. 7 is an exemplary flowchart for decoding CU syntaxes according to the present disclosure.

The video decoding apparatus initially decodes skip_flag among other prediction syntaxes (S702). When skip_flag is 1, no syntax for the CU except merge_idx includes in the bitstream, as described above. Accordingly, when skip_flag is 1 (S704), the video decoding apparatus decodes merge_idx from the bitstream (S706), and ends syntax decoding for the CU. When the CU has been encoded in the skip mode, whether deblocking filtering or SAO filtering is applied to the CU may be determined by syntaxes signaled at a higher level (e.g., CTU, slice, PPS, etc.) than the CU. Alternatively, at least some in-loop filtering may be skipped for the CU which has been encoded in the skip mode. For example, transquant_skip_flag may be automatically set to 1, and accordingly at least some in-loop filtering may be skipped.

When skip_flag is 0 (S704), prediction syntaxes for inter-prediction or intra-prediction are decoded. Initially, the video decoding apparatus decodes prediction type information (pred_mode_flag) indicating whether the prediction type of the current CU is intra-prediction or inter-prediction (S708). When pred_mode_flag indicates intra-prediction, for example, pred_mode_flag=1 (S710), the video decoding apparatus decodes intra-prediction information indicating the intra-prediction mode of the current CU (S712). On the other hand, when pred_mode_flag indicates inter-prediction, for example, pred_mode_flag=0 (S710), the video decoding apparatus decodes merge_flag (S714). Then, when merge_flag indicates the merge mode (S716), for example, merge_flag=1, merge_idx is decoded (S718). When merge_flag indicates that the mode is not the merge mode (S716), for example, merge_flag=0, prediction syntaxes for normal inter-prediction, that is, reference picture information and a motion vector difference are decoded (S720). In this case, predictive motion vector information may be additionally decoded. After decoding all the prediction syntaxes of the current CU in this way, the video decoding apparatus decodes the transform syntaxes of the current CU.

The video decoding apparatus first decodes cbf_cu indicating whether the coefficients in one luma block and two chroma blocks constituting a CU are all 0. However, when the prediction type of the current CU is intra-prediction, cbf_cu may be automatically set to 1 without decoding from the bitstream (S736). In addition, when the prediction type of the current CU is the skip mode, cbf_cu may be automatically set to 0. When the prediction type is the merge mode, cbf_cu may be automatically set to 1 (S732). When the prediction type of the current CU is inter-prediction and is not the merge mode, cbf_cu is decoded from the bitstream (S734).

After decoding cbf_cu, the video decoding apparatus decodes transquant_skip_flag depending on the value of cbf_cu. For example, when cbf_cu is 0 (S738), it means that non-zero luma components and non-zero chroma components are not present in the CU, and thus the syntax decoding for the CU is terminated without further decoding of transform syntaxes. When cbf_cu is 1 (S738), it means that a luma component or chroma component having a non-zero value is present in the CU, and therefore transquant_skip_flag is decoded (S740). Subsequently, transform syntaxes for each of the luma and chroma components in the CU are decoded (S742).

Figure 8:
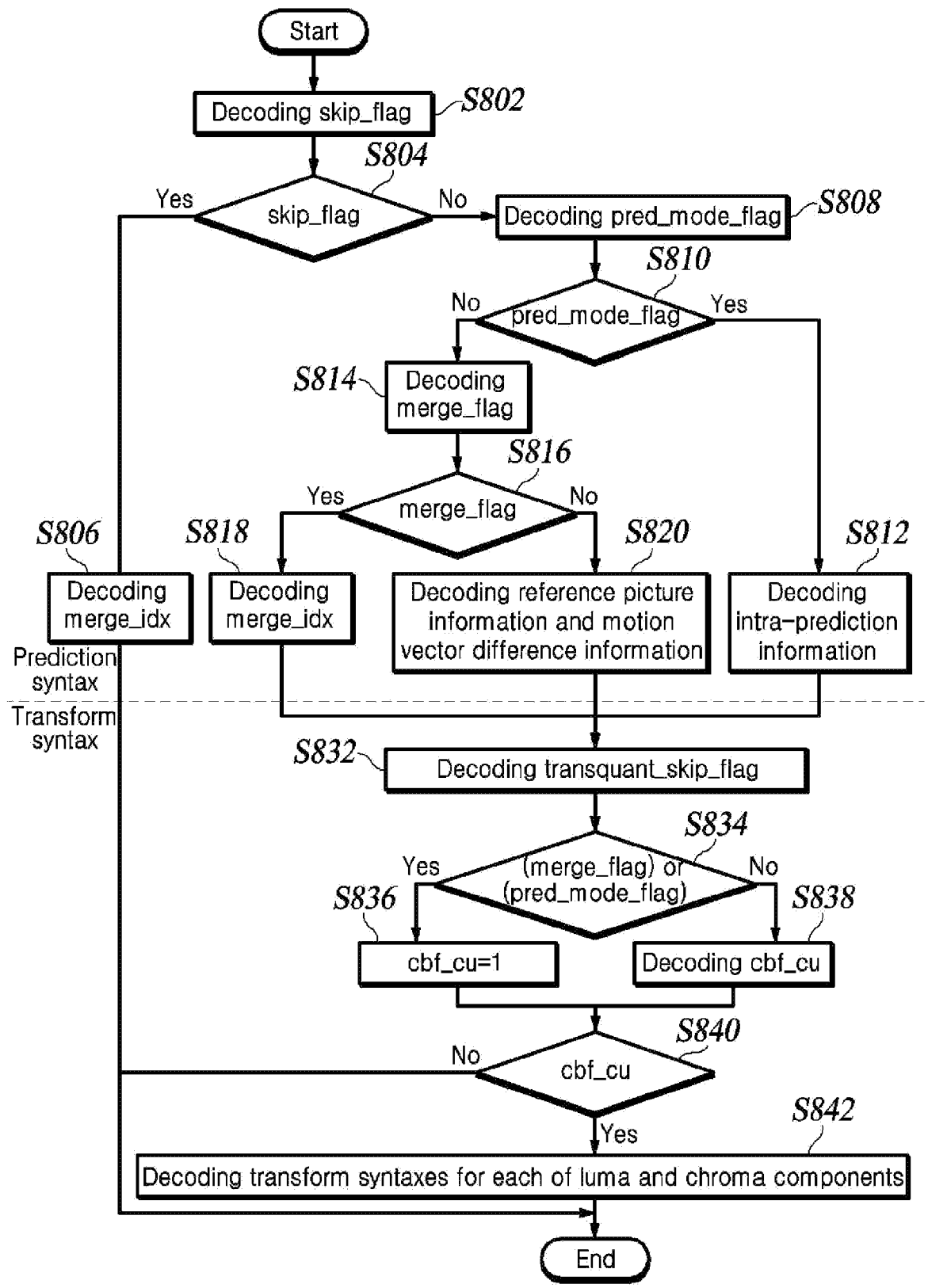
FIG. 8 is another exemplary flowchart for decoding CU syntaxes according to the present disclosure.

Alternatively, the decoding order of cbf_cu and transquant_skip_flag may be changed. FIG. 8 is another exemplary flowchart for decoding CU syntaxes according to the present disclosure.

Since the operations S802 to S820 for decoding the prediction syntaxes in FIG. 8 are the same as S702 to S720 for decoding the prediction syntaxes in FIG. 7, only the operation of decoding the transform syntaxes of the CU will be described below.

When the prediction type of the current CU is not in the skip mode, the video decoding apparatus decodes transquant_skip_flag from the bitstream after decoding the prediction syntaxes (S832). cbf_cu is decoded after transquant_skip_flag is decoded. For example, when the prediction type of the current CU is intra-prediction (pred_mode_flag=1) or the current CU is in the merge mode (merge_flag=1) (S834), cbf_cu is not decoded from the bitstream and is automatically set to 1 (S836). On the other hand, when the prediction type of the current CU is inter-prediction (pred_mode_flag=0) and the current CU is not in the merge mode (merge_flag=0) (S834), cbf_cu is decoded from the bitstream (S838).

Thereafter, when cbf_cu is 1, the video decoding apparatus decodes transform syntaxes for each of the luma and chroma components in the CU (S842).

In the above embodiments, transquant_skip_flag is a syntax indicating whether to skip transformation, quantization, and at least some in-loop filtering for the CU. Here, the "at least some in-loop filtering" may include both deblocking filtering and SAO filtering. Alternatively, it may mean in-loop filtering except deblocking filtering. in this case, the video decoding apparatus decodes transquant_skip_flag. When transquant_skip_flag is 1, the transformation, quantization and SAO filtering for the CU are skipped. When transquant_skip_flag is 1, the video decoding apparatus may further decode a deblocking filter flag (deblocking_filter_flag) indicating whether to perform deblocking filtering on the CU. In this case, when deblocking_filter_flag is 0, all the transformation, quantization, deblocking filtering and SAO filtering are skipped for the CU. On the other hand, when deblocking_filter_flag is 1, the transformation, quantization, and SAO filtering are skipped for the CU and deblocking filtering is performed.

The pixels in the CU are composed of three color components: one luma component (Y) and two chroma components (Cb, Cr). Hereinafter, a block composed of luma components is referred to as a luma block and a block composed of chroma components is referred to as a chroma block. One CU is composed of one luma block and two chroma blocks. The video decoding apparatus described in the present disclosure performs, for each of the luma and chroma blocks constituting the CU, the operation of decoding transform syntaxes for obtaining coefficients in the CU. For example, this operation corresponds to operation S742 of FIG. 7 or operation S842 of FIG. 8. However, it is apparent that decoding the transform syntaxes for each component is not necessarily performed in combination with FIGS. 7 and 8 and may be applied to a CU syntax structure other than the syntax structure in FIGS. 7 and 8.

Figure 9:
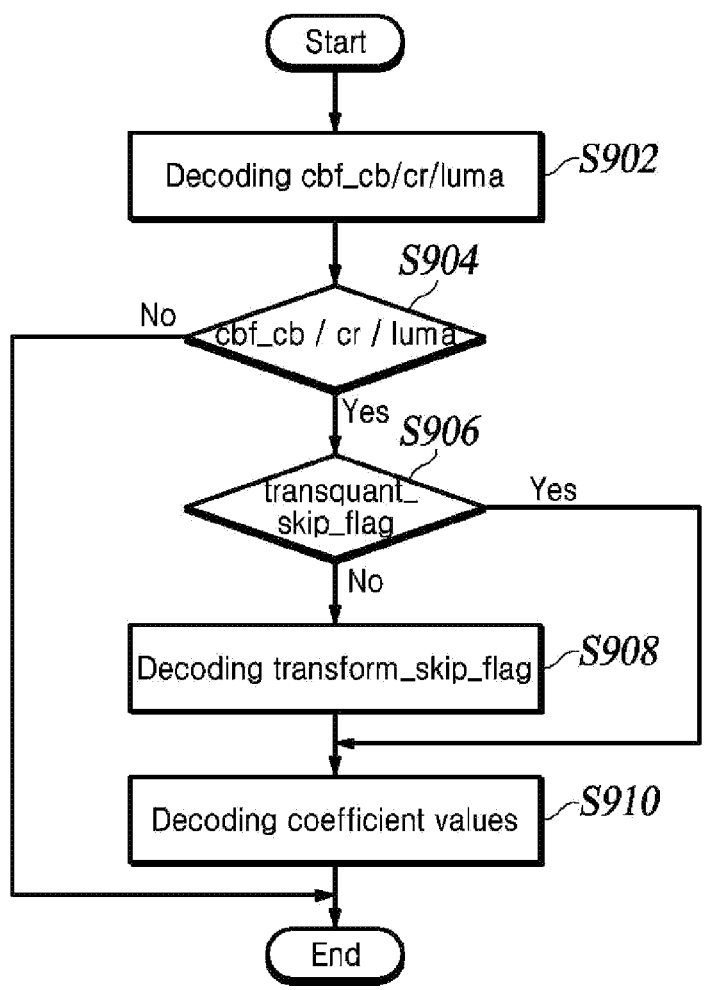
FIG. 9 is an exemplary flowchart for illustrating a process of decoding transform syntaxes for respective luma and chroma components.

FIG. 9 is an exemplary flowchart for decoding transform syntaxes for respective luma and chroma components.

The video decoding apparatus decodes, from a bitstream, a first chroma cbf (e.g., cbf_cb) indicating whether at least one non-zero coefficient is present in a first chroma block (e.g., a chroma block composed of Cb components) constituting the CU, a second chroma cbf (e.g., cbf_cr) indicating whether at least one non-zero coefficient is present in a second chroma block (e.g., a chroma block composed of Cr components), and a luma block (cbf_luma) indicating whether at least one non-zero coefficient is present in the luma block constituting the CU (S902). The decoding order of the three component cbf's is not limited, but the three component cbf's may be decoded, for example, in order of cbf_cb, cbf_cr, and cbf_luma.

When two cbf's decoded first in S902 are 0 (all coefficients in a block corresponding to each cbf are 0), the last cbf may not be decoded. Referring to FIG. 7 or 8, when cbf_cu is 1, cbf_cb, cbf_cr, and cbf_luma are decoded. Therefore, when the cbf's of the two components are all 0, cbf of the other component is necessarily 1.

After the cbf's of the three components are decoded, S904 to S910 are performed for each component. As an example, for the luma component, the video decoding apparatus determines whether cbf_luma=1 (S904). When cbf_luma=0, this means that there are no non-zero coefficients in the luma block, and thus all values in the luma block are set to 0.

On the other hand, when cbf_luma=1, the video decoding apparatus decodes transform_skip_flag indicating whether transformation for the luma block is performed. Referring to FIG. 7 or 8, when the decoded transquant_skip_flag is 1, transformation and quantization for the CU (all components in the CU) are skipped. Accordingly, when transquant_skip_flag is 1, decoding of transform_skip_flag for the luma component is not required. On the other hand, when transquant_skip_flag=0, this means that transformation and quantization for all components in the CU are not always skipped. Accordingly, when transquant_skip_flag is 0, the video decoding apparatus decodes transform_skip_flag indicating whether the transformation is performed on the luma component (S906, S908).

Then, the video decoding apparatus decodes the coefficient values for the luma component from the bitstream (S910).

Decoding cbf's for the three components constituting the CU in S902 has been described. Hereinafter, another embodiment of decoding cbf's for three components constituting the CU will be described with reference to FIG. 10. In this embodiment, a syntax called cbf_chroma indicating whether all coefficients in the two chroma blocks constituting the CU is 0 is further defined.

Figure 10:
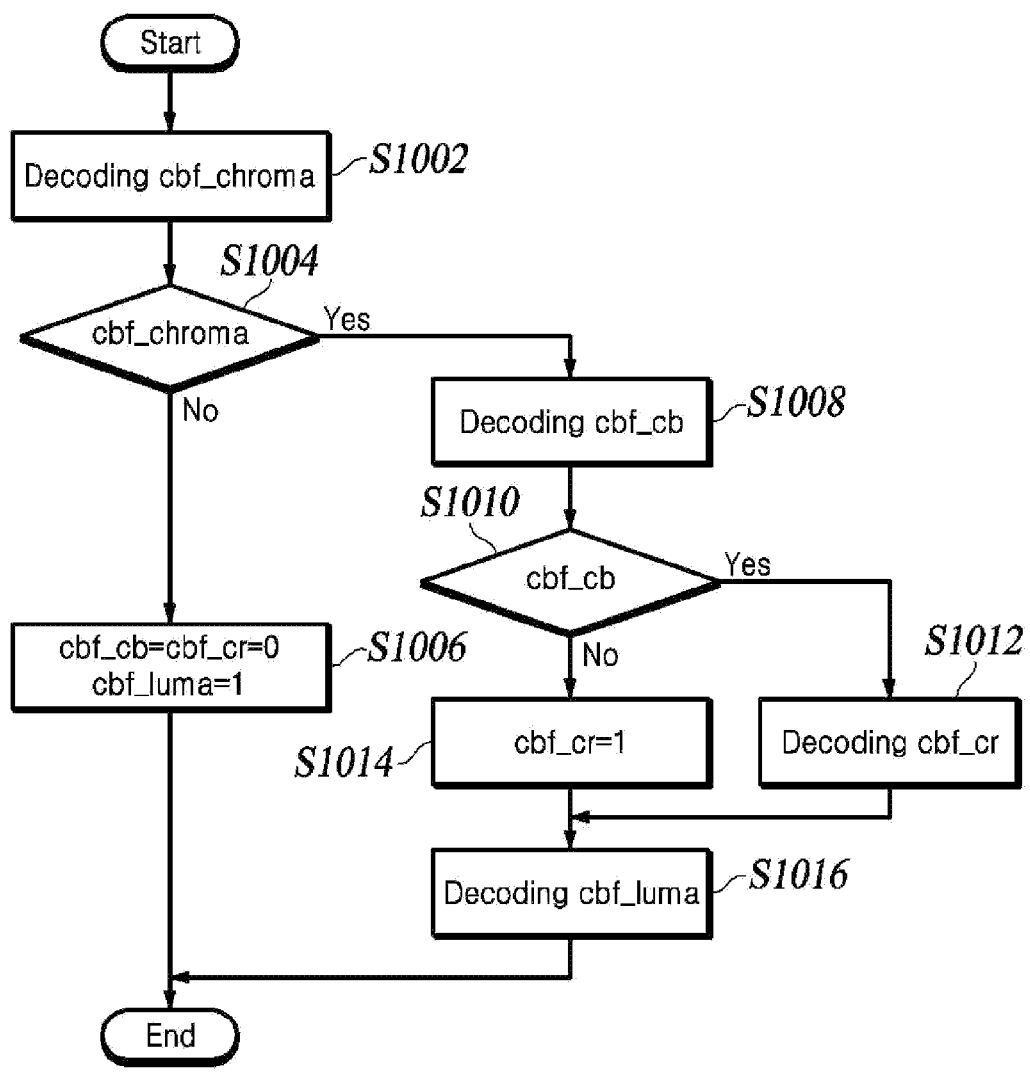
FIG. 10 is an exemplary flowchart for illustrating a method of decoding cbf for three components constituting a CU.

FIG. 10 is an exemplary flowchart for decoding cbf for three components constituting a CU.

The video decoding apparatus decodes cbf_chroma indicating whether all coefficients in the two chroma blocks constituting the CU are 0 (S1002).

When cbf_chroma is 0 (S1004), cbf's for the two chroma blocks, that is, cbf_cb and cbf_cr are both set to 0 (S1006). Referring to FIG. 7 or 8, cbf's for the three components are decoded when cbf_cu is 1. Accordingly, when cbf_chroma is 0, cbf_luma is automatically set to 1 (S1006).

On the other hand, when cbf_chroma is 1, the video decoding apparatus decodes cbf_cb (S1008). cbf_chroma=1 means that there is a non-zero coefficient in at least one of the two chroma blocks. Accordingly, when cbf for one of the two chroma blocks is 0, cbf for the other chroma block should be 1. Therefore, when the decoded cbf_cb is 0, cbf_cr is automatically set to 1 (S1010, S1014). On the other hand, when cbf_cb is 1, cbf_cr is decoded from the bitstream (S1012). Here, the decoding order of cbf_cb and cbf_cr may be changed. When decoding of cbf_cb and cbf_cr is completed, the video decoding apparatus decodes cbf_luma (S1016).

The operations after the decoding of cbf_cb, cbf_cr, and cbf_luma are the same as those in FIG. 9.

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the explicitly described above embodiments but is inclusive of the claims and equivalents thereto.

What is claimed is:

1. A method for decoding a video sequence of pictures, the method comprising:
   determining a current coding unit to be decoded among coding units which are divided from a coding tree unit in a current picture by a tree structure;
   decoding, from a bitstream, syntax elements of a coding unit level related to the current coding unit; and
   reconstructing the current coding unit using the syntax elements of the coding unit level,
   wherein the decoding of the syntax elements of the coding unit level comprises:
      decoding prediction syntax elements for the current coding unit at the coding unit level, wherein the prediction syntax elements include a skip flag indicating whether the current coding unit has been predicted in a skip mode; and
      after the decoding of the prediction syntax elements, decoding transform syntax elements for the current coding unit at the coding unit level, wherein the transform syntax elements include a single flag of coding unit cbf indicating whether all coefficients in both of a luma block and two chroma blocks constituting the current coding unit are zero,
      wherein the transform syntax elements are not decoded until the decoding of the prediction syntax elements is completed, and
   wherein the transform syntax elements are decoded depending on the skip flag, and are not decoded when the skip flag indicates that the current coding unit has been predicted in the skip mode.

2. The method of claim 1, wherein the reconstructing of the current coding unit comprises:
   generating a prediction block for the current coding unit from the prediction syntax elements, using a size of the current coding unit as a prediction unit size;
   generating a residual block for the current coding unit from the transform syntax elements, using the size of the current coding unit as a transform unit size; and
   reconstructing the current coding unit by adding the prediction block to the residual block.

3. The method of claim 1, wherein the decoding of the transform syntax elements comprises:
   decoding the coding unit cbf; and
   decoding a transformation/quantization skip flag when the coding unit cbf indicates that at least one of coefficients in the luma block and the two chroma blocks constituting the current coding unit is non-zero, the transformation/quantization skip flag indicating whether inverse transformation, inverse quantization, and at least part of in-loop filterings are skipped.

4. The method of claim 3, wherein the transformation/quantization skip flag indicates whether the inverse transformation, the inverse quantization, and an in-loop filtering except for deblocking filtering are skipped for the current coding unit.

5. The method of claim 4, wherein the decoding of the transform syntax elements comprises:
when the transformation/quantization skip flag indicates that the inverse transformation, the inverse quantization, and the in-loop filtering except for the deblocking filtering are skipped for the current coding unit, decoding a deblocking filter flag indicating whether to skip the deblocking filtering for the reconstructed coding unit.

6. The method of claim 1, wherein, when the coding unit cbf indicates that at least one of the coefficients in the luma block and the two chroma blocks constituting the current coding unit is non-zero, the decoding of the transform syntax elements comprises:
decoding one of a chroma cbf and a luma cbf; and
depending on a value of the decoded one of the chroma cbf and the luma cbf, decoding the other one of the chroma cbf and the luma cbf,
wherein the chroma cbf indicates whether all coefficients in the two chroma blocks are zero, and the luma cbf indicates whether all coefficients in the luma block are zero.

7. The method of claim 6, further comprising:
when the chroma cbf indicates that at least one non-zero coefficient is present in the two chroma blocks, decoding a first sub-chroma cbf indicating whether all coefficients in a first chroma block between the two chroma blocks are zero; and
when the first sub-chroma cbf indicates that at least one non-zero coefficient is present in the first chroma block, decoding a second sub-chroma cbf indicating whether all coefficients in a second chroma block between the two chroma blocks are zero.

8. The method of claim 1, wherein, when the skip flag does not indicate that the current coding unit has been predicted in the skip mode, the decoding of the transform syntax elements comprises:
when a prediction mode of the current coding unit is neither an intra mode nor a merge mode, decoding the coding unit cbf from the bitstream, and
when the prediction mode of the current coding unit is the intra mode or the merge mode, inferring the coding unit cbf as a value indicating that at least part of the luma block and the two chroma blocks have a non-zero coefficient, without decoding the coding unit cbf from the bitstream.

9. The method of claim 1, further comprising performing a deblocking-filtering on block boundaries in a reconstructed image including reconstructed coding units,
wherein reconstructed pixels in a coding unit predicted in the skip mode are deblocking-filtered under control of not a syntax element of the coding unit level but a syntax element of an upper level than the coding unit level.

10. A video encoding apparatus for encoding a video sequence of pictures, the apparatus comprising:
an encoder configured to:
determine a current coding unit to be encoded among coding units which are divided from a coding tree unit in a current picture by a tree structure, and
encode, into a coding unit level of a bitstream, syntax elements resulting from encoding of the current coding unit, by:
encoding prediction syntax elements for the current coding unit at the coding unit level, the prediction syntax elements including a skip flag indicating whether the current coding unit is predicted in a skip mode, and
encoding, after the encoding of the prediction syntax elements, transform syntax elements for the current coding unit at the coding unit level, wherein the transform syntax elements include a single flag of coding unit cbf indicating whether all coefficients in both of a luma block and two chroma blocks constituting the current coding unit are zero; and
a reconstructor configured to reconstruct the current coding unit,
wherein the transform syntax elements are not encoded until the encoding of the prediction syntax elements is completed, and
wherein the transform syntax elements are decoded depending on the skip flag, and are not encoded when the skip flag indicates that the current coding unit is predicted in the skip mode.

11. The apparatus of claim 10, wherein the reconstructor is configured to:
generate a prediction block for the current coding unit from the prediction syntax elements, using a size of the current coding unit as a prediction unit size;
generate a residual block for the current coding unit from the transform syntax elements, using the size of the current coding unit as a transform unit size; and
reconstruct the current coding unit by adding the prediction block to the residual block.

12. The apparatus of claim 10, wherein the encoder encodes a transformation/quantization skip flag when the coding unit cbf indicates that at least one of coefficients in the luma block and the chroma blocks constituting the current coding unit is non-zero, the transformation/quantization skip flag indicating whether inverse transformation, inverse quantization, and at least part of in-loop filterings are skipped.

13. The apparatus of claim 12, wherein the transformation/quantization skip flag indicates whether the inverse transformation, the inverse quantization, and an in-loop filtering except for deblocking filtering are skipped for the current coding unit.

14. The apparatus of claim 13, wherein, when the transformation/quantization skip flag indicates that the inverse transformation, the inverse quantization, and the in-loop filtering except for the deblocking filtering are skipped for the current coding unit, the encoder encodes a deblocking filter flag indicating whether to skip the deblocking filtering for the reconstructed coding unit.

15. The apparatus of claim 10, wherein, when the coding unit cbf indicates that at least one of the coefficients in the luma block and the two chroma blocks constituting the current coding unit is non-zero, the encoder is configured to:
encode one of a chroma cbf and a luma cbf; and
depending on a value of the encoded one of the chroma cbf and the luma cbf, encode the other one of the chroma cbf and the luma cbf,
wherein the chroma cbf indicates whether all coefficients in the two chroma blocks are zero, and the luma cbf indicates whether all coefficients in the luma block are zero.

16. The apparatus of claim 15, wherein, when the chroma cbf indicates that at least one non-zero coefficient is present in the two chroma blocks, the encoder is configured to:
  encode a first sub-chroma cbf indicating whether all coefficients in a first chroma block between the two chroma blocks are zero; and
  encode, when the first sub-chroma cbf indicates that at least one non-zero coefficient is present in the first chroma block, a second sub-chroma cbf indicating whether all coefficients in a second chroma block between the two chroma blocks are zero.

17. The apparatus of claim 10, wherein, when the skip flag does not indicate that the current coding unit has been predicted in the skip mode, the encoder is configured to:
  encode the coding unit cbf, when a prediction mode of the current coding unit is neither an intra mode nor a merge mode,
  wherein, when the prediction mode of the current coding unit is the intra mode or the merge mode, the coding unit cbf is not encoded such that a value thereof is inferred as a value indicating that at least part of the luma block and the two chroma blocks have a non-zero coefficient.

18. The apparatus of claim 10, wherein the reconstructor performs a deblocking-filtering on block boundaries in a reconstructed image including reconstructed coding units,
  wherein reconstructed pixels in a coding unit predicted in the skip mode are deblocking-filtered under control of not a syntax element of the coding unit level but a syntax element of an upper level than the coding unit level.

19. A non-transitory recording medium storing a bitstream generated by a method of encoding a video sequence of pictures, the method comprising:
  determining a current coding unit to be encoded among coding units which are divided from a coding tree unit in a current picture by tree structure; and
  encoding, into a coding unit level of a bitstream, syntax elements resulting from encoding of the current coding unit, by:
    encoding prediction syntax elements for the current coding unit into the coding unit level, the prediction syntax elements including a skip flag indicating whether the current coding unit is predicted in a skip mode; and
    encoding, after the encoding of the prediction syntax elements, transform syntax elements for the current coding unit into the coding unit level, wherein the transform syntax elements include a single flag of coding unit cbf indicating whether all coefficients in both of a luma block and two chroma blocks constituting the current coding unit are zero; and
  wherein the transform syntax elements are not encoded until the encoding of the prediction syntax elements is completed, and
  wherein the transform syntax elements are decoded depending on the skip flag, and are not encoded when the skip flag indicates that the current coding unit is predicted in the skip mode.

* * * * *